(12) United States Patent
Hoermann

(10) Patent No.: US 12,420,873 B2
(45) Date of Patent: Sep. 23, 2025

(54) MOTOR VEHICLE WITH ROLL BAR

(71) Applicant: MAGNA STEYR Fahrzeugtechnik GmbH & Co KG, Graz (AT)

(72) Inventor: Reinhard Hoermann, Seiersberg (AT)

(73) Assignee: MAGNA STEYR Fahrzeugtechnik GmbH & Co KG, Graz (AT)

( * ) Notice: Subject to any disclaimer, the term of this patent is extended or adjusted under 35 U.S.C. 154(b) by 0 days.

(21) Appl. No.: 18/828,001

(22) Filed: Sep. 9, 2024

(65) Prior Publication Data

US 2025/0178675 A1    Jun. 5, 2025

(30) Foreign Application Priority Data

Nov. 30, 2023   (EP) ..................................... 23213384

(51) Int. Cl.
*B62D 33/027*   (2006.01)
*B60R 21/13*    (2006.01)

(52) U.S. Cl.
CPC .......... *B62D 33/0273* (2013.01); *B60R 21/13* (2013.01)

(58) Field of Classification Search
CPC .... B62D 33/0273; B62D 33/037; B60R 21/13
See application file for complete search history.

(56) References Cited

U.S. PATENT DOCUMENTS

| | | | | |
|---|---|---|---|---|
| 5,997,066 A * | 12/1999 | Scott | ................... | B62D 33/0273 |
| | | | | 296/57.1 |
| 6,283,525 B1 * | 9/2001 | Morse | ................ | B62D 33/0273 |
| | | | | 296/26.02 |
| 7,665,799 B1 * | 2/2010 | Winter, IV | .............. | B60R 21/13 |
| | | | | 296/183.1 |
| 8,727,415 B2 * | 5/2014 | Smith | .................. | B62D 33/033 |
| | | | | 296/26.11 |
| 11,433,953 B2 * | 9/2022 | Smith | ................. | B62D 33/0273 |
| 2006/0061114 A1 * | 3/2006 | Leitner | .............. | B62D 33/0273 |
| | | | | 296/26.11 |
| 2008/0100075 A1 | 5/2008 | Derecktor | | |
| 2019/0225172 A1 * | 7/2019 | Frederick | ........... | B62D 33/0207 |
| 2020/0406828 A1 | 12/2020 | Simonin et al. | | |

FOREIGN PATENT DOCUMENTS

GB    2436819 A   * 10/2007   ................ B60P 7/15

OTHER PUBLICATIONS

European Patent Office search report for EP 23213384, dated Mar. 27, 2024.

\* cited by examiner

*Primary Examiner* — Paul N Dickson
*Assistant Examiner* — Matthew Joseph Ganci
(74) *Attorney, Agent, or Firm* — Jordan IP Law, LLC; Todd A. Vaughn

(57) ABSTRACT

A motor vehicle having an upwardly open loading surface and a roll bar. The roll bar includes at least one boundary wall, a mounting base, and mounting elements. The at least one boundary wall forms a surface arranged at a top region of the roll bar in a roll bar mode in which the roll bar is arranged in a front region of a loading surface of the motor vehicle. The mounting base is arranged at a bottom region of the roll bar in the roll bar mode. The mounting elements are operable to facilitate selective movement of the roll bar between the roll bar mode and a plurality of modes that include a dividing element mode, a load-space extension mode, and a storage mode.

16 Claims, 5 Drawing Sheets

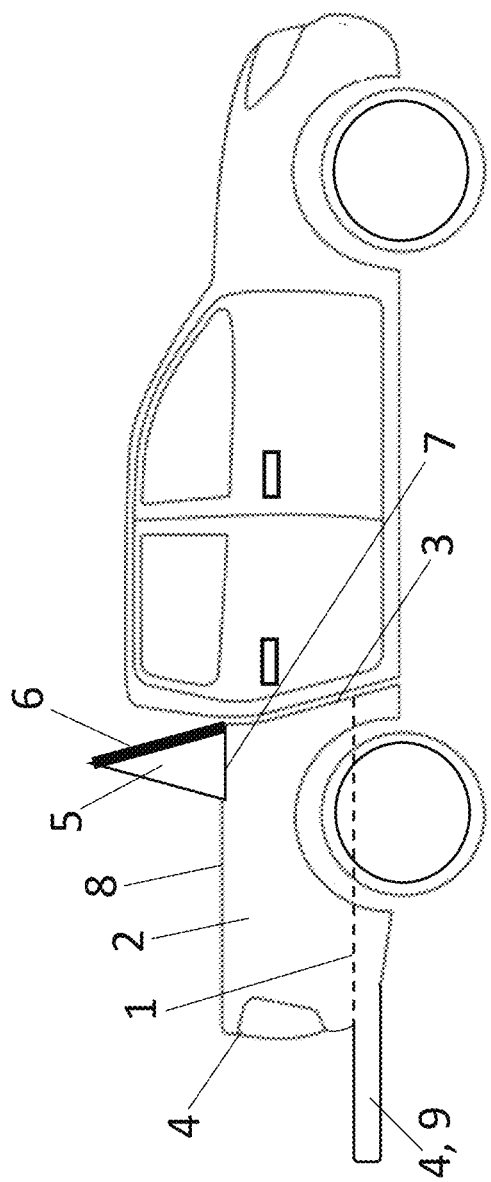
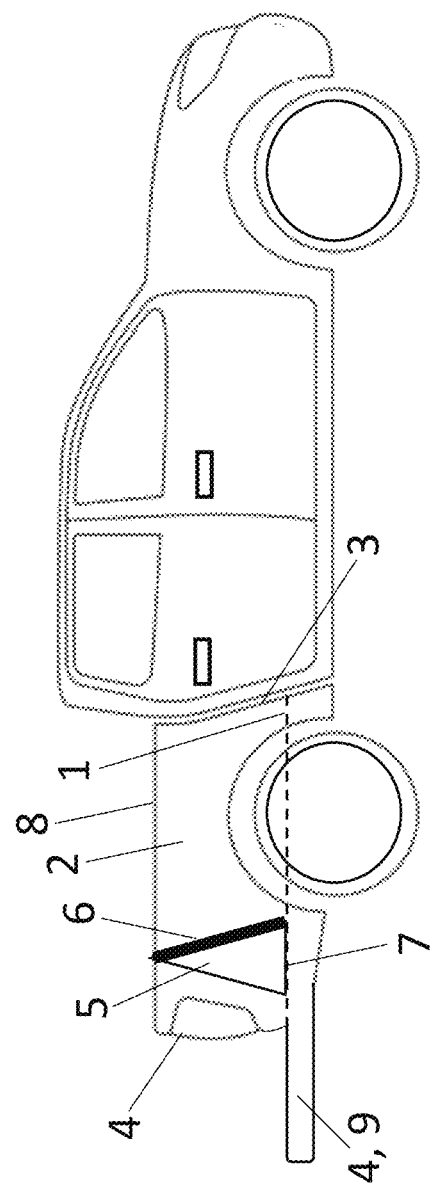
FIG. 1
FIG. 2

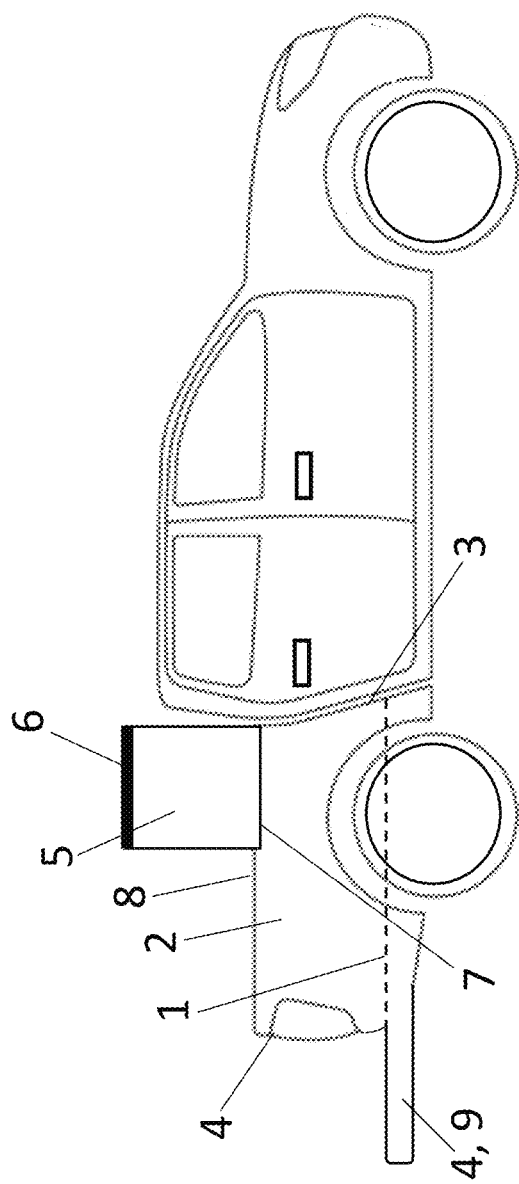
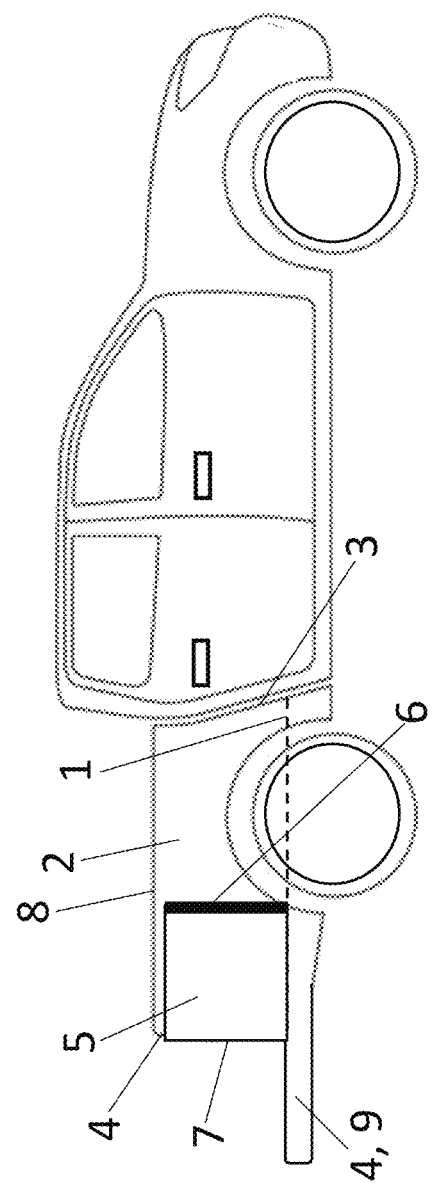

MOTOR VEHICLE WITH ROLL BAR

CROSS-REFERENCE TO RELATED APPLICATIONS

The present application claims priority under 35 U.S.C. § 119 to European Patent Publication No. EP23213384.3 (filed on Nov. 30, 2023), which is hereby incorporated by reference in its complete entirety.

TECHNICAL FIELD

The present disclosure relates to a motor vehicle, in particular, a pickup truck comprising an upwardly open loading surface and a roll bar.

BACKGROUND

It is known that motor vehicles can have an upwardly open loading surface, which can be located behind an enclosed cab for the driver and for passengers in the direction of travel. Vehicles of this kind are known, in particular, as "pickups" or "pickup trucks."

It is known that vehicles, in particular, vehicles which do not have a roof, at least in some section or sections, can use a roll bar which, in the event of a rollover event, can have the effect of maintaining a survival space for occupants of the vehicle and/or preventing a roof from being pressed in too far. Such roll bars are usually connected in a fixed and stable manner to the load-bearing structure of the motor vehicle. Removal of a roll bar that is interfering with the loading of the loading surface, for example, is not envisaged.

There is a known practice of dividing the loading surface of a pickup into two regions, for example, by setting up and fastening a dividing wall in a suitable manner on the loading surface. If it is not currently being used, the dividing wall can then be stowed and taken along in the vehicle, for example. This requires additional space for stowing in the vehicle.

The loading surface of a pickup can have a tailgate as a rear wall at the rear in the direction of travel. Such a tailgate can have a hinge on the underside thereof, for example, and be opened by pivoting downward in order, for example, to load the loading surface more easily. When the tailgate is open, there is the risk that loaded goods will be lost from the loading surface, especially when the motor vehicle is being driven.

SUMMARY

It is an object of the present disclosure to specify a motor vehicle, in particular a pickup, comprising an upwardly open loading surface and a roll bar which avoids at least some of the abovementioned problems. In particular, the roll bar should perform one or more additional functions in addition to its function as a means of protection against rollovers.

The object is achieved by a motor vehicle, in particular a pickup truck comprising an upwardly open loading surface, bounded by side walls, a front wall, and a rear wall. The motor vehicle further comprises a roll bar having at least one boundary wall operable in a manner such that in a roll bar mode, the boundary wall of the roll bar forms a surface which is arranged on top, at the front, or at the rear of the roll bar, and which extends substantially over the entire width of the motor vehicle. In the roll bar mode, the roll bar has at least one mounting base arranged at the bottom of the roll bar operable in a manner such that in the roll bar mode, the roll bar is arranged in a front region of the loading surface, and the mounting base of the roll bar is mounted in the region of the upper edge of the side walls.

The roll bar and the rest of the motor vehicle have mounting elements which are designed to enable the roll bar to be demounted easily out of the roll bar mode by the user of the motor vehicle and to be mounted in at least one, preferably at least two or all three, of the following modes: a dividing element mode wherein the boundary wall of the roll bar forms a vertical dividing wall above the loading surface, and the mounting base of the roll bar is mounted behind the boundary wall; a load-space extension mode wherein the boundary wall of the roll bar forms a vertical dividing wall above an extension surface which extends the loading surface toward the rear, and the mounting base of the roll bar is mounted in front of the boundary wall; and a storage mode wherein the boundary wall of the roll bar forms a vertical wall above the loading surface and directly adjacent to the front wall of the loading surface, and the mounting base of the roll bar is mounted behind the boundary wall.

The motor vehicle comprises an upwardly open loading surface, bounded by side walls, a front wall, and a rear wall, a roll bar having at least one boundary wall operable in a manner such that in a roll bar mode, the boundary wall of the roll bar forms a surface which is arranged on top, at the front, or at the rear of the roll bar and which extends substantially over the entire width of the motor vehicle, i.e., in the y-direction of the motor vehicle. In the roll bar mode, the roll bar has at least one mounting base arranged at the bottom of the roll bar. In the roll bar mode, the roll bar is arranged in a front region of the loading surface, and the mounting base of the roll bar is mounted in the region of the upper edge of the side walls. The roll bar and the rest of the motor vehicle have mounting elements which are designed to enable the roll bar to be demounted easily out of the roll bar mode by the user of the motor vehicle and to be mounted in at least one, preferably at least two or all three, of the following modes: a dividing element mode wherein the boundary wall of the roll bar forms a vertical dividing wall above the loading surface, and the mounting base of the roll bar is mounted behind the boundary wall, preferably in a rear region of the side walls; a load-space extension mode wherein the boundary wall of the roll bar forms a vertical dividing wall above an extension surface (preferably the opened tailgate) which extends the loading surface toward the rear, and the mounting base of the roll bar is mounted in front of the boundary wall, preferably in a rear region of the side walls; and a storage mode wherein the boundary wall of the roll bar forms a vertical wall above the loading surface and directly adjacent to the front wall of the loading surface, and the mounting base of the roll bar is mounted behind the boundary wall, preferably on the side walls.

According to the present disclosure, a motor vehicle is equipped with a multi-positioned and multi-functional roll bar that is designed to be removed from its usual position and use as a roll bar and to be employed in at least one other position and function. The roll bar is therefore fastened on the rest of the motor vehicle via mounting elements, which make it possible for a user of the vehicle to demount and mount the roll bar as appropriate, preferably without having to use a tool. The mounting elements are formed on the roll bar by the mounting base and/or by additional fastening elements which interact with the mounting base. Corresponding mounting points are provided on the motor vehicle, enabling the roll bar to be mounted in two, three or all four positions mentioned.

The additional modes of the roll bar may be: a dividing element mode, a load-space extension mode, and a storage mode.

In the a dividing element mode, the boundary wall of the roll bar forms a vertical dividing wall above, preferably directly above, the loading surface, and the mounting base of the roll bar is mounted behind the boundary wall, preferably in a rear region of the side walls. In the dividing element mode, the roll bar serves to divide a region of the loading surface from a different region of the loading surface, similarly to a conventional dividing wall. However, it is likewise possible for the dividing wall to be removed and to be used as a roll bar. In the dividing element mode, the dividing wall, namely the roll bar, is fastened on the motor vehicle, in particular on the side walls which bound the loading surface.

In the load-space extension mode, the boundary wall of the roll bar forms a vertical dividing wall above, preferably directly above, an extension surface, preferably the opened tailgate, which extends the loading surface toward the rear, and the mounting base of the roll bar is mounted in front of the boundary wall, preferably in a rear region of the side walls. In the load-space extension mode, the roll bar is rotated through 180 degrees on a vertical axis as compared with the dividing element mode, with the result that the boundary wall is at the rear instead of at the front. As a result, the boundary wall can delimit the extension surface, preferably the opened tailgate, vertically at the rear and thus prevent the loss of goods.

In the storage mode, the boundary wall of the roll bar forms a vertical wall above, preferably directly above, the loading surface and directly adjacent to the front wall of the loading surface, and the mounting base of the roll bar is mounted behind the boundary wall, preferably on the side walls. In the storage mode, the roll bar is stored in a space-saving manner. Depending on the design, the boundary wall of the roll bar can be used to reinforce the front wall of the loading surface in the storage mode.

In the context of this document, the terms "front," "rear," "top," and "bottom" always relate to the motor vehicle and its usual direction of travel when traveling forward.

The roll bar preferably has a triangular shape in a side view of the motor vehicle, wherein, in the roll bar mode, the boundary wall of the roll bar preferably forms a surface which is arranged at the front of the roll bar. The roll bar preferably has the triangular shape in the side view of the motor vehicle in all modes and, as a particular preference, also during changing of the mode.

In another embodiment, the roll bar has a quadrilateral shape in a side view of the motor vehicle, that is to say, in particular, the shape of a rectangle or square, wherein, in the roll bar mode, the boundary wall of the roll bar preferably forms a surface which is arranged on top of the roll bar. The roll bar preferably has the quadrilateral shape in the side view of the motor vehicle in all modes and, as a particular preference, also during changing of the mode.

The roll bar, including its boundary wall and its mounting base, is preferably a rigid component in a side view of the motor vehicle, with the result that the angles of the components of the roll bar relative to one another and thus the shape of the roll bar in the side view are always maintained when the roll bar is demounted out of the roll bar mode and mounted in a different mode by the user of the motor vehicle.

In the dividing element mode and/or in the load-space extension mode and/or in the storage mode, the mounting base of the roll bar is preferably mounted directly or indirectly on the side walls bounding the loading surface and/or on the loading surface. The mounting base of the roll bar can have fastening flanges, for example. The mounting base can be designed for plug connection and/or for screw fastening, for example.

The mounting base of the roll bar can comprise at least one fastening point for mounting the roll bar on the rest of the motor vehicle, or at least one left-hand and one right-hand fastening point, and it preferably comprises a plurality of fastening points for mounting the roll bar at the bottom end thereof on the rest of the motor vehicle, or all the fastening points for mounting the roll bar at the bottom end thereof on the rest of the motor vehicle, or all the fastening points for mounting the roll bar on the rest of the motor vehicle.

In the load-space extension mode, the extension surface which extends the loading surface toward the rear can be formed by an opened tailgate of the motor vehicle.

The longitudinal extent of the boundary wall of the roll bar, said wall being aligned in the y direction in the motor vehicle in every usage mode of the roll bar, is preferably adjustable at least between two or three predetermined, preferably latching, lengths.

The roll bar can have side parts and at least one central part, wherein the central part can be mounted so as to be movable relative to the side parts. As a preferred option, the side parts comprise at least one tube and/or at least one surface, and the central part likewise comprises at least one tube and/or at least one surface. The tube of the central part can have a different radius from the tubes of the side parts and, as a result, they can be mounted in such a way as to be movable relative to one another, and/or the surface of the central part or the surface of the side parts can be of hollow design and, as a result, they can be mounted so as to be movable relative to one another since one surface (side parts or central part) can be arranged within the hollow other surface (central part or side parts).

DRAWINGS

One or more embodiments of the present disclosure will be illustrated by way of example in the drawings and explained in the description hereinbelow.

FIG. 1 is a schematic side view of a motor vehicle in a first embodiment according to the present disclosure, in the roll bar mode.

FIG. 2 is a schematic side view of the motor vehicle of FIG. 1, in the dividing element mode.

FIG. 5 is a schematic side view of a motor vehicle in a second embodiment according to the present disclosure, in the roll bar mode.

FIG. 6 is a schematic side view of the motor vehicle of FIG. 5, in the dividing element mode.

DESCRIPTION

Figure 3:
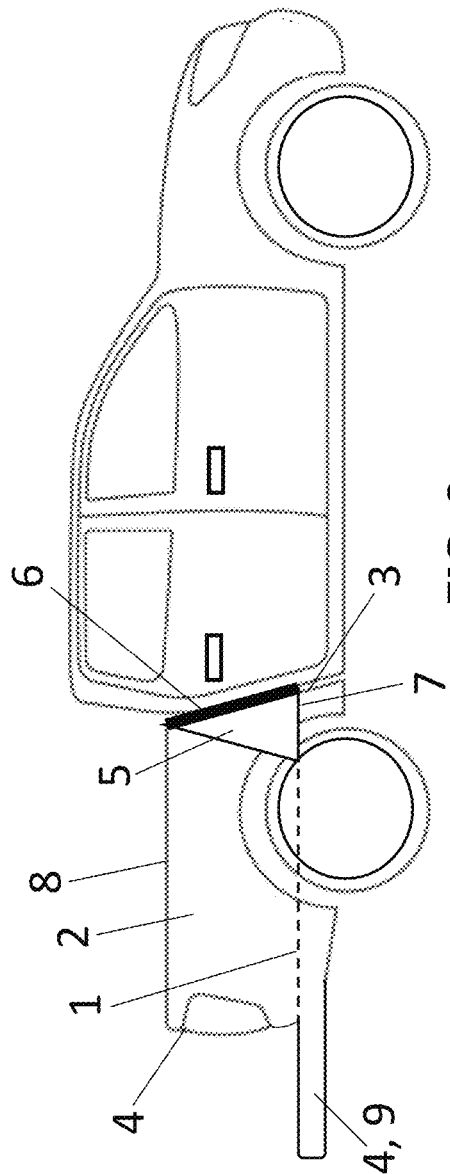
FIG. 3 is a schematic side view of the motor vehicle of FIG. 1, in the storage mode.

FIGS. 1 through 4 show a motor vehicle according to the present disclosure in a first embodiment. The motor vehicle is a pickup with an upwardly open loading surface 1 in the rear region of the vehicle, the surface being shown on the left in each of the figures. The loading surface 1 is bounded by side walls 2, a front wall 3 and a rear wall 4, which also comprises an openable tailgate 9. The tailgate 9 is shown in the open state in FIGS. 1 through 8.

The motor vehicle comprises a roll bar 5. In a side view, as shown in FIGS. 1 through 4, the roll bar 5 has a triangular shape. The roll bar 5 is shown in greater detail in FIG. 9.

Another embodiment of a roll bar 5 is shown in FIGS. 5 through 8. The roll bar 5 has a quadrilateral shape in a side view of the motor vehicle. The boundary wall 6 of the roll bar 5 is a surface arranged on top of the roll bar 5 in the roll bar mode of this embodiment (FIG. 5).

The roll bar 5 has a boundary wall 6, wherein the boundary wall 6 of the roll bar 5 forms a surface arranged at the front of the roll bar 5 in the roll bar mode shown in FIG. 1, said surface extending substantially over the entire width of the motor vehicle. The boundary wall 6 can also be formed on top of the roll bar 5, in particular in a quadrilateral roll bar 5, as shown in FIG. 5.

The roll bar 5 furthermore has a mounting base 7, which is located at the bottom of the roll bar 5 in the roll bar mode.

In the roll bar mode, the roll bar 5 is arranged in a front region of the loading surface 1, close to the front end of the loading surface 1. The mounting base 7 of the roll bar 5 is mounted on the side walls 2 in the region of the upper edges 8 of the side walls 2.

The roll bar 5 and the rest of the motor vehicle have mounting elements which are designed to enable the roll bar 5 to be demounted easily out of the roll bar mode by the user of the motor vehicle and to be mounted in at least one, preferably at least two or all three, of the modes and thus positions shown in FIGS. 2 and 6, FIGS. 3 and 7, and FIGS. 4 and 8.

FIGS. 2 and 6 each show a dividing element mode, wherein, in the dividing element mode, the boundary wall 6 of the roll bar 5 forms a vertical dividing wall above the loading surface 1, adjoining the loading surface 1, and the mounting base 7 of the roll bar 5 is mounted behind the boundary wall 6 in the direction of travel. In the case of a triangular roll bar 5, as shown in FIG. 2, the mounting base 7 is located at the bottom in the dividing element mode, and, in the case of a roll bar 5 with a boundary wall 6 situated at the top in the roll bar mode, can be situated at the rear (FIG. 6).

Figure 7:
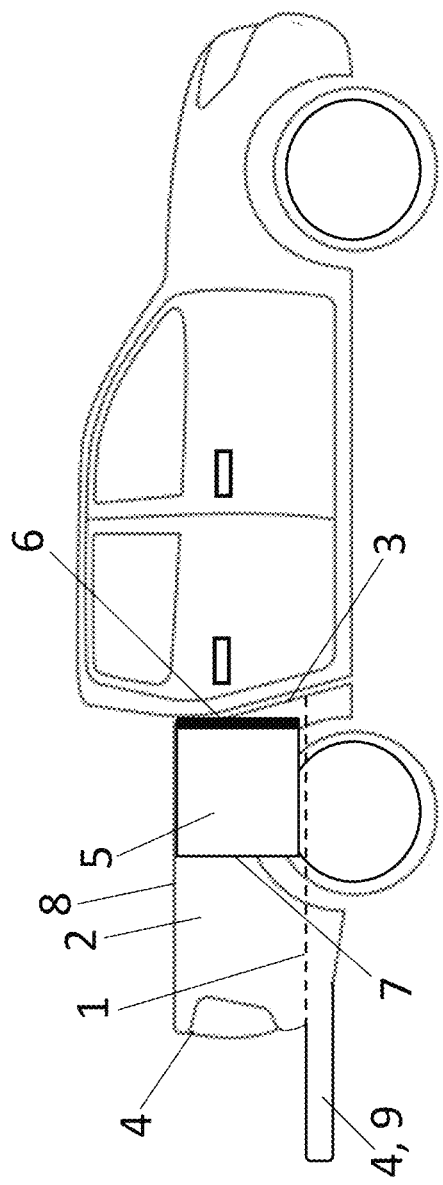
FIG. 7 is a schematic side view of the motor vehicle of FIG. 5, in the storage mode.

FIGS. 3 and 7 each show a storage mode, wherein, in the storage mode, the boundary wall 6 of the roll bar 5 forms a vertical wall above the loading surface 1 and directly adjacent to the front wall 3 of the loading surface 1. At least in part, the boundary wall 6 can be so close to the front wall 3 that it reinforces the front wall 3. The mounting base 7 of the roll bar 5 is mounted behind the boundary wall 6—being arranged in the motor vehicle at the bottom (FIG. 3) or at the rear (FIG. 7) of the roll bar 5.

Figure 4:
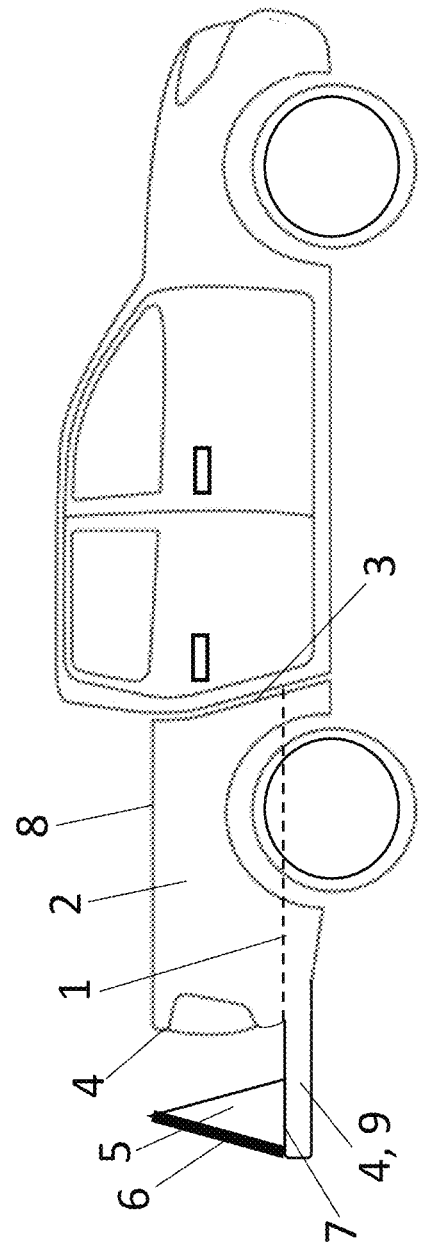
FIG. 4 is a schematic side view of the motor vehicle of FIG. 1, in the load-space extension mode.
Figure 8:
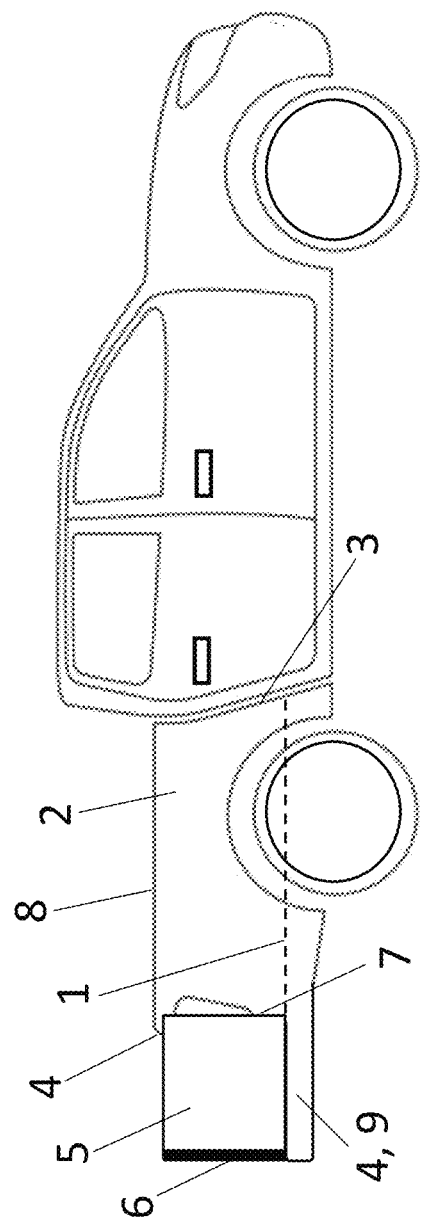
FIG. 8 is a schematic side view of the motor vehicle of FIG. 5, in the load-space extension mode.

FIGS. 4 and 8 each show the use of a roll bar 5 in a load-space extension mode, wherein, in the load-space extension mode, the boundary wall 6 of the roll bar 5 forms a vertical dividing wall directly above an extension surface 9 which extends the loading surface 1 toward the rear, and the mounting base 7 of the roll bar 5 is mounted in front of the boundary wall 6.

The extension surface 9 which extends the loading surface 1 toward the rear can be formed by an opened tailgate of the motor vehicle.

In the dividing element mode and/or in the load-space extension mode and/or in the storage mode, the mounting base 7 of the roll bar 5 can be mounted directly or indirectly on the side walls 2 bounding the loading surface 1 and/or on the loading surface 1 of the motor vehicle.

Figure 9:
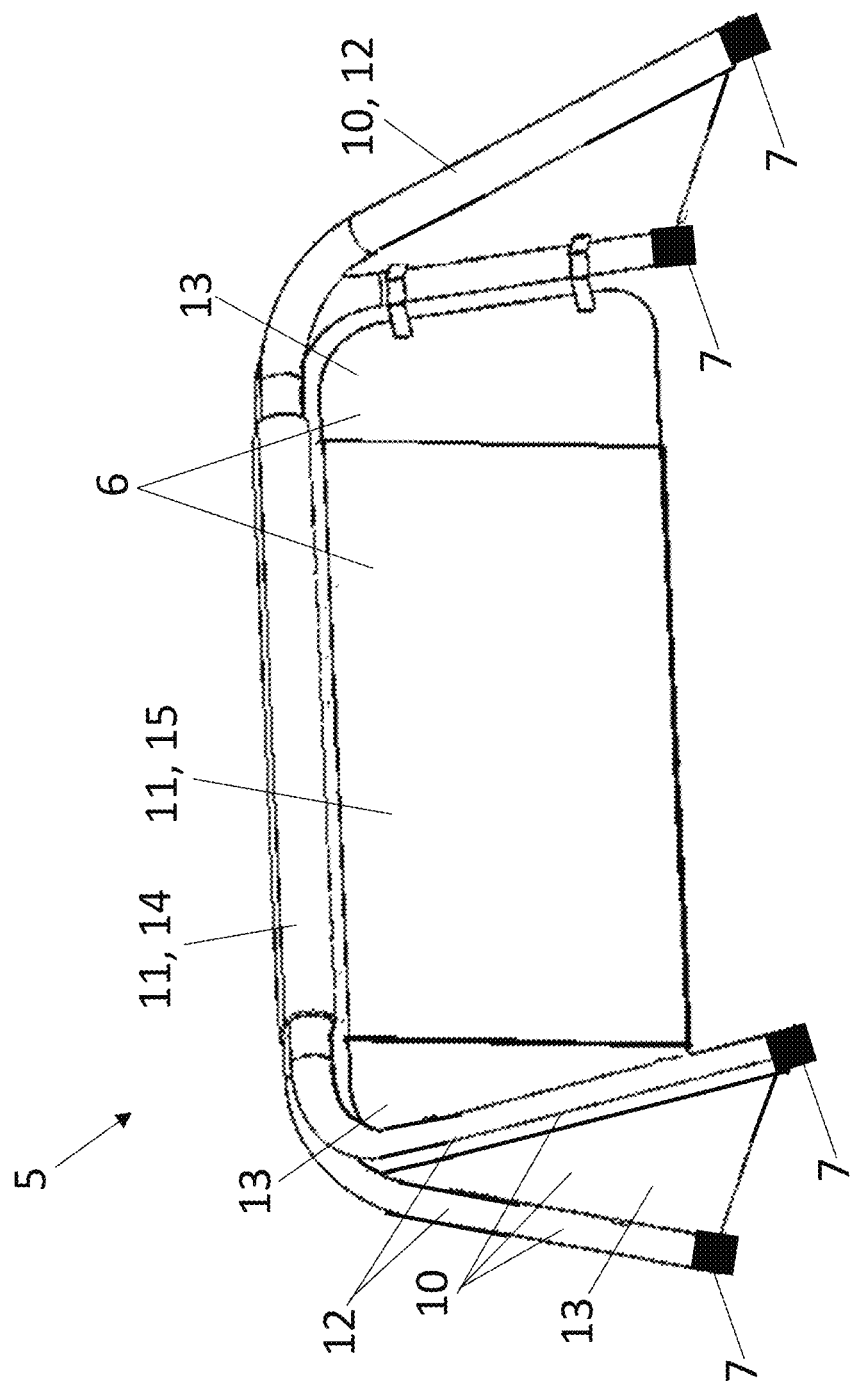
FIG. 9 is a schematic three-dimensional view of a roll bar of the motor vehicle of FIGS. 1 to 4.

Finally, FIG. 9 shows an embodiment of a roll bar 5 in more detail. The longitudinal extent of the boundary wall 6 of the roll bar 5, said wall being located in the y direction in the motor vehicle, is adjustable between a plurality of predetermined and latching lengths.

For this purpose, the roll bar 5 has side parts 10 on the left and right of a central part 11, wherein the central part 11 is mounted so as to be movable relative to the side parts 10.

The side parts 10 are each formed by tubes 12 and optionally a surface 13. The central part 11 is likewise formed by tubes 14, preferably two tubes 14 arranged side by side, and optionally a surface 15. The tubes 14 of the central part 11 are designed with radii different from those of the tubes 12 of the side parts 10 and, as a result, the tubes can be moved relative to one another, being located one inside the other. Via holes and latching pins on the outer and inner parts, or vice versa, predetermined lengths can be set in a simple manner. The surface 15 of the central part 11 or the surfaces 13 of the side parts 10 can likewise be of hollow design and the respective other surface part or parts can be arranged in this hollow part and they can thus be mounted so as to be movable axially relative to one another. The surface parts can also feature latching of positions, e.g. via holes and latching pins.

It is thus possible to prepare a roll bar 5 for easy adjustment to at least two different lengths, which are assigned to at least two different modes of those described for the roll bar 5 and are thus matched in an optimum manner to different widths to be covered in the motor vehicle.

The terms "coupled," "attached," or "connected" may be used herein to refer to any type of relationship, direct or indirect, between the components in question, and may apply to electrical, mechanical, fluid, thermal, optical, electromagnetic, electromechanical, or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS 1 loading surface
2 side wall
3 front wall
4 rear wall
5 roll bar
6 boundary wall
7 mounting base
8 upper edge
9 extension surface
10 side part
11 central part
12 tube of the side part
13 surface of the side part
14 tube of the central part
15 surface of the central part

What is claimed is:

1. A motor vehicle, comprising:
   an upwardly open loading surface, bounded by side walls, a front wall, and a rear wall;
   a roll bar having at least one boundary wall, the roll bar being operable in a roll bar mode in which: the roll bar is arranged in a front region of the loading surface, to have a quadrilateral shape such that in the roll bar mode, the boundary wall forms a surface which is arranged on top of the roll bar at a front region or at a rear region of of the roll bar and which extends substantially over an entire width of the motor vehicle, and the roll bar has at least one mounting base arranged at the bottom of the roll bar and mounted in a region of the upper edge of the side walls; and
   mounting elements operable to facilitate selective movement of the roll bar between the roll bar mode and a plurality of modes that include:
      a dividing element mode in which the boundary wall forms a vertical dividing wall above the loading surface, and the mounting base is mounted behind the boundary wall,
      a load-space extension mode in which the boundary wall forms a vertical dividing wall above an extension surface which extends the loading surface toward the rear of the motor vehicle to delimit the extension surface vertically at the rear and thereby prevent loss of goods from the loading surface, and the mounting base is mounted in front of the boundary wall, and
      a storage mode in which the boundary wall forms a vertical wall above the loading surface and directly adjacent to the front wall of the loading surface, and the mounting base of the roll bar is mounted behind the boundary wall.

2. The motor vehicle of claim 1, wherein the roll bar, including its boundary wall and its mounting base, forms a rigid component forming angles relative to one another in order that a shape of the roll bar is always maintained when the roll bar is selectively demounted out of the roll bar mode and mounted in a different mode.

3. The motor vehicle of claim 1, wherein, in the dividing element mode and/or in the load-space extension mode and/or in the storage mode, the mounting base of the roll bar is mounted directly or indirectly on the side walls bounding the loading surface and/or on the loading surface.

4. The motor vehicle of claim 1, wherein, in the load-space extension mode, the extension surface which extends the loading surface toward the rear is formed by an opened tailgate of the motor vehicle.

5. The motor vehicle of claim 1, wherein a longitudinal extent of the boundary wall of the roll bar, the boundary wall being located in a y-direction in the motor vehicle, is adjustable at least between a plurality of predetermined latching lengths.

6. The motor vehicle of claim 1, wherein the roll bar has side parts and at least one central part mounted to be axially movable relative to one another.

7. The motor vehicle of claim 6, wherein the side parts comprise at least one tube and/or at least one surface, and the central part comprises at least one tube and/or at least one surface.

8. The motor vehicle of claim 7, wherein:
   the tube of the central part has a different radius from the tubes of the side parts to facilitate the axial movement of the side parts and the central part relative to one another, and/or
   the surface of the central part or the surfaces of the side parts is/are of hollow design to facilitate the axial movement of the side parts and the central part relative to one another.

9. A motor vehicle, comprising:
   an open loading surface;
   a roll bar having at least one boundary wall, the roll bar being operable in a roll bar mode in which: the roll bar is arranged in a front region of the loading surface, to have a quadrilateral shape such that in the roll bar mode, the boundary wall forms a surface which is arranged on top of the roll bar at a front region of the roll bar, and the roll bar has at least one mounting base arranged at the bottom of the roll bar and mounted in a region of the upper edge of the side walls; and
   mounting elements operable to facilitate selective movement of the roll bar between the roll bar mode and a plurality of modes that include:
      a dividing element mode in which the boundary wall forms a vertical dividing wall above the loading surface, and the mounting base is mounted behind the boundary wall,
      a load-space extension mode in which the boundary wall forms a vertical dividing wall above an extension surface which extends the loading surface toward the rear of the motor vehicle to delimit the extension surface vertically at the rear and thereby prevent loss of goods from the loading surface, and the mounting base is mounted in front of the boundary wall, and
      a storage mode in which the boundary wall forms a vertical wall above the loading surface and directly adjacent to the front wall of the loading surface, and the mounting base of the roll bar is mounted behind the boundary wall.

10. The motor vehicle of claim 9, wherein the roll bar, including its boundary wall and its mounting base, forms a rigid component forming angles relative to one another in order that a shape of the roll bar is always maintained when the roll bar is selectively demounted out of the roll bar mode and mounted in a different mode.

11. The motor vehicle of claim 9, wherein, in the dividing element mode and/or in the load-space extension mode and/or in the storage mode, the mounting base of the roll bar is mounted directly or indirectly on the side walls bounding the loading surface and/or on the loading surface.

12. The motor vehicle of claim 9, wherein, in the load-space extension mode, the extension surface which extends the loading surface toward the rear is formed by an opened tailgate of the motor vehicle.

13. The motor vehicle of claim 9, wherein a longitudinal extent of the boundary wall of the roll bar, the boundary wall being located in a y-direction in the motor vehicle, is adjustable at least between a plurality of predetermined latching lengths.

14. The motor vehicle of claim 9, wherein the roll bar has side parts and at least one central part mounted to be movable relative to the side parts.

15. The motor vehicle of claim 14, wherein the side parts comprise at least one tube and/or at least one surface, and the central part comprises at least one tube and/or at least one surface.

16. A roll bar for a motor vehicle, the roll bar comprising:
   a quadrilateral shape and at least one boundary wall forming a surface arranged at a top region of the roll bar in a roll bar mode in which the roll bar is arranged in a front region of a loading surface of the motor vehicle to have a quadrilateral shape such that in the roll bar mode the boundary wall forms a surface which is arranged on top of the roll bar at a front region of an upwardly open loading surface of the motor vehicle, the roll bar extending substantially over an entire width of the motor vehicle, and the roll bar has at least one mounting base arranged at the bottom region of the roll bar in the roll bar mode and mounted in an upper edge of side walls of the motor vehicle that bound the loading surface; and mounting elements operable to facilitate selective movement of the roll bar between the roll bar mode and a plurality of modes that include:

a dividing element mode in which the boundary wall forms a vertical dividing wall above the loading surface, and the mounting base is mounted behind the boundary wall, a load-space extension mode in which the boundary wall forms a vertical dividing wall above an extension surface which extends the loading surface toward the rear of the motor vehicle to delimit the extension surface vertically at the rear and thereby prevent loss of goods from the loading surface and the mounting base is mounted in front of the boundary wall, and a storage mode in which the boundary wall forms a vertical wall above the loading surface and directly adjacent to the front wall of the loading surface, and the mounting base of the roll bar is mounted behind the boundary wall.

* * * * *